(12) United States Patent
Shiraki

(10) Patent No.: US 10,491,010 B2
(45) Date of Patent: Nov. 26, 2019

(54) CONTROL APPARATUS FOR CONTROLLING THE CHARGING AND DISCHARGING OF STORAGE BATTERIES THROUGH A POWER CONVERTER

(71) Applicant: DENSO CORPORATION, Kariya, Aichi-pref. (JP)

(72) Inventor: Tooru Shiraki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 154 days.

(21) Appl. No.: 15/554,584

(22) PCT Filed: Feb. 16, 2016

(86) PCT No.: PCT/JP2016/000794
§ 371 (c)(1),
(2) Date: Aug. 30, 2017

(87) PCT Pub. No.: WO2016/152006
PCT Pub. Date: Sep. 29, 2016

(65) Prior Publication Data
US 2018/0076637 A1 Mar. 15, 2018

(30) Foreign Application Priority Data
Mar. 24, 2015 (JP) .................................. 2015-061537

(51) Int. Cl.
*H02J 7/00* (2006.01)
*H02J 7/35* (2006.01)
*H02J 3/32* (2006.01)

(52) U.S. Cl.
CPC .......... *H02J 7/0021* (2013.01); *H02J 7/0022* (2013.01); *H02J 7/35* (2013.01); *H02J 3/32* (2013.01); *Y02P 90/50* (2015.11)

(58) Field of Classification Search
CPC ............................... H02J 7/007; H02J 7/0021
(Continued)

(56) References Cited

U.S. PATENT DOCUMENTS

| 2014/0111163 | A1* | 4/2014 | Yamauchi | .......... H01M 10/441 320/134 |
| 2014/0197686 | A1* | 7/2014 | Hiramura | ............. H02J 7/0013 307/29 |
| 2016/0020613 | A1 | 1/2016 | Kimura et al. | |

FOREIGN PATENT DOCUMENTS

| JP | 2012244780 A | 12/2012 |
| JP | 2013169089 A | 8/2013 |

(Continued)

*Primary Examiner* — Richard V Muralidar
(74) *Attorney, Agent, or Firm* — Harness, Dickey & Pierce, P.L.C.

(57) ABSTRACT

A control apparatus of a storage battery system which discharges power from of storage batteries, converts the power, and supplies the power to a load, and which receives supply of power from an outside, converts the power, and charges the storage batteries is provided. The control apparatus includes: a reading part that reads charge command power and discharge command power; a distribution part that determines distribution charge power and distribution discharge power; and a charge-and-discharge execution part that allows charge or discharge of the storage batteries. The distribution part sequentially determines the distribution charge power for each of the storage batteries in an ascending order of charging rates of the storage batteries. When the reading part reads the discharge command power, the distribution part sequentially determines the distribution discharge power for each of the storage batteries in a descending order of the charging rates of the storage batteries.

2 Claims, 6 Drawing Sheets

(58) Field of Classification Search
USPC .......................................................... 320/134
See application file for complete search history.

(56) References Cited

FOREIGN PATENT DOCUMENTS

| | | |
|---|---|---|
| JP | 2013172567 A | 9/2013 |
| JP | 2014030334 A | 2/2014 |

* cited by examiner

CONTROL APPARATUS FOR CONTROLLING THE CHARGING AND DISCHARGING OF STORAGE BATTERIES THROUGH A POWER CONVERTER

CROSS REFERENCE TO RELATED APPLICATIONS

This application is a U.S. National Phase Application under 35 U.S.C. 371 of International Application No. PCT/JP2016/000794 filed on Feb. 16, 2016 and published in Japanese as WO 2016/152006 A1 on Sep. 29, 2016. This application is based on and claims the benefit of priority from Japanese Patent Application No. 2015-061537 filed on Mar. 24, 2015. The entire disclosures of all of the above applications are incorporated herein by reference.

TECHNICAL FIELD

The present disclosure relates to a control apparatus for a storage battery system. The storage battery system discharges power from multiple storage batteries configuring a storage battery group, converts the discharged power by using a power converter, and supplies the converted power to a load. The storage battery system also receives supply of power from an outside to the storage battery group, converts the received power by using the power converter, and charges the multiple storage batteries with the converted power.

BACKGROUND ART

For example, Patent Literature 1 identified below discloses a storage battery system including multiple storage batteries. Each of the storage batteries is configured by a secondary battery such as a lithium ion battery. The system discharges direct current power from the storage batteries, converts the discharged power by using a DC/DC converter, and increases voltage of the converted power. The system further converts the power into alternating current power by using a DC/AC inverter, and supplies the converted power to a load. In addition, the storage battery system receives power supplied from the outside, converts the received power by using the DC/DC converter, decreases voltage of the converted power, and then charges the storage batteries with the power.

Charge and discharge by each of the storage batteries is controlled by a controller provided for each of the storage batteries. In this case, each of the controllers performs control based on a command received from a higher controller. The higher controller is a device that adjusts demand power corresponding to power demanded by a load, and supply power corresponding to power supplied from the storage battery system to the load. Each of the controllers performs control in such a manner that the sum total of power to be charged or discharged by the storage batteries becomes equal to command power received from the higher controller. Accordingly, the storage battery group configured by the multiple storage batteries functions as a single large storage battery as viewed from the higher controller.

Charging rates of the respective storage batteries do not necessarily become uniform. Accordingly, generally adopted is discharge of the storage batteries in the descending order of the charging rates of the storage batteries at the time of discharge of the storage battery system, and charge of the storage batteries in the ascending order of the charging rates of the storage batteries at the time of charge of the storage battery system. This method securely achieves charge and discharge in correspondence with command power issued from the higher controller.

PRIOR ART LITERATURE

Patent Literature

Patent Literature 1: JP 2013-169089 A

SUMMARY OF INVENTION

According to the charge or discharge performed in this manner by using the storage battery system, use rates of the storage batteries may differ from the batteries. More specifically, only particular storage batteries included in the multiple storage batteries may be frequently used for charge or discharge, while other storage batteries may be less used and perform substantially no charge or discharge. In this case, deterioration of the particular storage batteries may considerably progress in comparison with other storage batteries.

A DC/DC converter is characterized by a considerable drop of efficiency when operated at an operation point greatly different from rated input or output. More specifically, a loss of electric energy at the time of charge or discharge of each of the storage batteries increases, which leads to lower efficiency of the storage battery system.

The inventor of the present application therefore has found a demand for a control apparatus that controls a storage battery system, the control apparatus capable of achieving high efficiency of a storage battery system while reducing progress in deterioration of particular storage batteries of a storage battery group.

It is an object of the present disclosure to provide a control apparatus for a storage battery system, the control apparatus being capable of achieving high efficiency while improving use rates of storage batteries configuring a storage battery group.

According to one example of the present disclosure, a control apparatus of a storage battery system which discharges power from multiple storage batteries configuring a storage battery group, converts the discharged power by using a power converter, and supplies the converted power to a load, and which receives supply of power from an outside to the storage battery group, converts the received power by using the power converter, and charges the multiple storage batteries with the converted power is provided. The control apparatus includes: a reading part that reads charge command power and discharge command power for the storage battery group; a distribution part that determines distribution charge power corresponding to power to be charged in each of the multiple storage batteries, based on the charge command power, and determines distribution discharge power corresponding to power to be discharged from each of the multiple storage batteries, based on the discharge command power; and a charge/discharge execution part that allows charge or discharge of the multiple storage batteries, based on the distribution charge power or the distribution discharge power determined by the distribution part. When the reading part reads the charge command power, the distribution part sequentially determines the distribution charge power for each of the multiple storage batteries in an ascending order of charging rates of the storage batteries, so that the distribution charge power for a storage battery exhibiting chargeable power higher than a rated input/output of the power converter becomes substantially equal to the rated input/output. When the reading part reads the discharge command power, the distribution part sequentially determines the distribution discharge power for each of the multiple storage batteries in a descending order of the charging rates of the storage batteries, so that the distribution discharge power for a storage battery exhibiting dischargeable power higher than the rated input/output of the power converter becomes substantially equal to the rated input/output.

According to the control apparatus of the present disclosure, the distribution charge power is determined in the ascending order of charging rates of the multiple storage batteries when the reading part reads the charge command power. In this case, the distribution charge power for the storage battery exhibiting chargeable power higher than the rated input/output of the power converter is set to a value substantially equal to the rated input/output. According to this configuration, the storage battery group is so controlled as to charge distribution charge power substantially equal to the rated input/output of the power converter in the ascending order of the charging rate at the time of a request for charge by the storage battery group. Accordingly, it may be possible to perform charge with high efficiency.

According to the control apparatus of the present disclosure, the distribution discharge power is determined in the descending order of charging rates of the multiple storage batteries when the reading part reads the discharge command power. In this case, the distribution charge power for the storage battery exhibiting dischargeable power higher than the rated input/output of the power converter is set to a value substantially equal to the rated input/output. According to this configuration, the storage battery group is so controlled as to discharge distribution discharge power substantially equal to the rated input/output of the power converter in the descending order of the charging rate at the time of a request for discharge by the storage battery group. Accordingly, it may be possible to perform discharge with high efficiency.

According to the control apparatus of the present disclosure, the distribution charge power or the distribution discharge power is determined in the ascending order or the descending order of the charging rate of the storage battery. In this case, use rates of the storage batteries configuring the storage battery group improve. Moreover, the distribution charge power and the distribution discharge power are set to values substantially equal to the rated input/output of the power converter. Accordingly, it may be possible to achieve high efficiency.

According to the present disclosure, a control apparatus for a storage battery system is provided, the control apparatus being capable of achieving high efficiency while improving use rates of storage batteries configuring a storage battery group.

BRIEF DESCRIPTION OF DRAWINGS

The above and other aspects, features and advantages of the present disclosure will become more apparent from the following detailed description made with reference to the accompanying drawings. In the drawings.

DESCRIPTION OF EMBODIMENTS

Embodiments according to the present disclosure are hereinafter described with reference to the accompanying drawings. Similar constituent elements in the respective figures are given similar reference numbers to a maximum extent for easy understanding of the description. The same matters are not repeatedly described.

Figure 1:
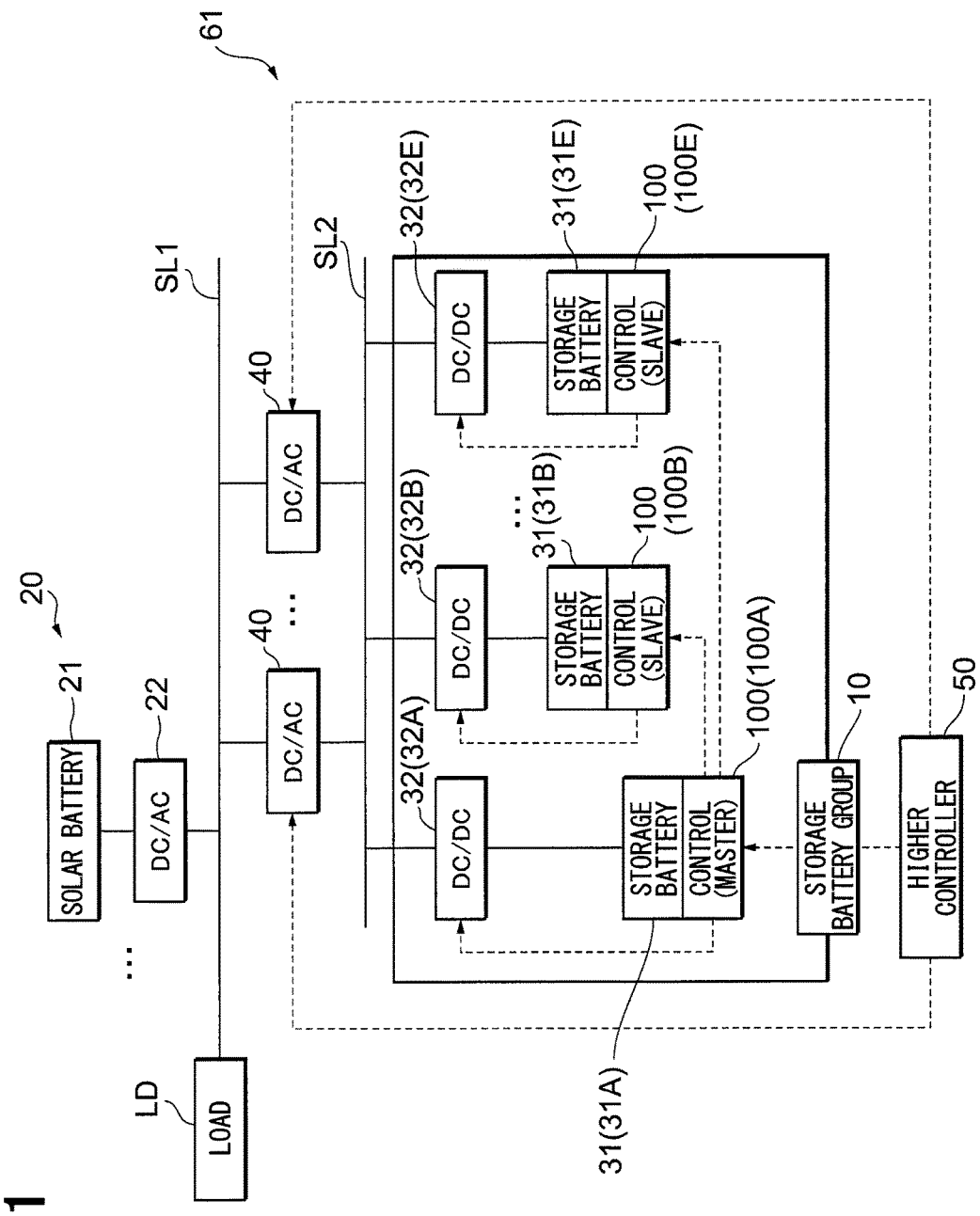
FIG. 1 is a configuration diagram illustrating a control apparatus according to a first embodiment, and a storage battery system including the control apparatus.

A storage battery system 61, which is a control target by a control apparatus 100 of a first embodiment of the present disclosure, is initially described with reference to FIG. 1. The storage battery system 61 is a system configured to supply power to a load LD provided on a factory, a building, or the like.

Note that the load LD receives power from a commercial power supply (not shown). The load LD receives three-phase 200 V alternating current power from the commercial power supply via an alternating current bus line SL1. Note that the load LD may receive single-phase alternating current power as well as three-phase power.

The storage battery system 61 is connected to an intermediate point of the alternating current bus line SL1 provided to connect the commercial power supply and the load LD. The storage battery system 61 is installed to supply supplementary power to the load LD via the alternating current bus line SL1 and to reduce power supplied from the commercial power supply to the load LD. A solar power generation unit 20 is also connected to the alternating current bus line SL1.

The solar power generation unit 20 is a device for converting solar energy into electric power, and supplying the power to the load LD. Power generated by the solar power generation unit 20 is supplied to the load LD via the alternating current bus line SL1.

The solar power generation unit 20 includes a solar battery 21 and an inverter 22. The solar battery 21 is a device which receives sunlight, and converts energy of the sunlight into direct current power for power generation. The solar battery 21 is installed outdoors.

The inverter 22 is a power converter for converting direct current power generated by the solar battery 21 into three-phase 200 V alternating current power, and supplying the converted power to the alternating current bus line SL1. As illustrated in FIG. 1, a pair of solar battery 21 and the inverter 22 is connected to the alternating current bus line SL1 according to the present embodiment. However, the present embodiment is not limited to the above configuration. A larger number of the solar battery 21 and the inverter 22 may be provided in accordance with the scale of the load LD or performance of the solar battery 21.

Power is supplied from the solar power generation unit 20 to the load LD in the daytime of a sunny day. In this case, power supplied from the commercial power supply to the load LD decreases, and therefore an electricity bill to be paid to an electric power provider lowers.

The storage battery system 61 is capable of temporarily charging power supplied from the solar power generation unit 20 or the commercial power supply and not consumed by the load LD. When power consumed by the load LD is high, the storage battery system 61 may supply the charged power to the load LD to reduce power supplied from the commercial power supply to the load LD. When an electricity bill varies for each time zone in a bill system to be introduced, the storage battery system 61 may charge power received from the commercial power supply in a time zone of a low electricity bill, and supply power to the load LD by discharging power in a time zone of a high electricity bill. Furthermore, the storage battery system 61 may supply power to the load LD in a time zone corresponding to the maximum power consumption by the load LD for reduction of power received from the commercial power supply, thereby lowering contract power made with the electric power provider and decreasing an electricity bill to be paid to the electric power provider.

Power charged by the storage battery system 61 is supplied to the load LD via a direct current bus line SL2 and the alternating current bus line SL1. The direct current bus line SL2 is connected to the alternating current bus line SL1 via interconnection inverters 40.

The storage battery system 61 includes five storage batteries 31 configured by storage batteries 31A, 31B, 31C, 31D, and 31E, and five DC/DC converters 32 configured by DC/DC converters 32A, 32B, 32C, 32D, and 32E. FIG. 1 does not show the storage batteries 31C and 31D and the DC/DC converters 32C and 32D. According to the storage battery system 61, one of the storage batteries 31 and one of the DC/DC converters 32 are paired to configure five pairs connected to the direct current bus line SL2 in parallel. The DC/DC converters 32A, 32B, 32C, 32D, and 32E are collectively referred to the converters 32 as well. The converters 32 correspond to an example of a power converter according to the present disclosure.

Each of the storage batteries 31 as the storage batteries 31A, 31B, 31C, 31D, and 31E is a secondary battery configured by a lithium ion battery or nickel-hydrogen battery. Capacities of the respective storage batteries 31 may be either equal to each other, or different from each other.

The DC/DC converters 32 as the DC/DC converters 32A, 32B, 32C, 32D, and 32E are electrically connected to the storage batteries 31A, 31B, 31C, 31D, and 31E, respectively. Each of the DC/DC converters 32 is a power converter which increases voltage of direct current power discharged from the corresponding storage battery 31, and supplies the power to the direct current bus line SL2. In other words, each of the DC/DC converters 32 is considered as a device which connects the direct current bus line SL2 and the storage battery 31 while adjusting voltage between the direct current bus line SL2 and the corresponding storage battery 31.

Note that the number of pairs of the storage batteries 31 and the DC/DC converters 32 is not limited to five, but may be a larger or smaller number determined in accordance with the capacities of the storage batteries 31 or the scale of the load LD.

Each of the interconnection inverters 40 is a power converter which converts direct current power received via the direct current bus line SL2 into alternating current, and supplies the converted power to the alternating current bus line SL1. In addition, each of the interconnection inverters 40 converts alternating current power received via the alternating current bus line SL1 into direct current power, and supplies the direct current power to the direct current bus line SL2. Accordingly, the interconnection inverter 40 achieves bidirectional power supply between the alternating current bus line SL1 and the direct current bus line SL2.

The control apparatus 100 is hereinafter described. The control apparatus 100 is a part of a computer system which performs integrated control for the entire storage battery system 61. The control apparatus 100 includes a master controller 100A, and slave controllers 100B, 100C, 100D, and 100E. FIG. 1 does not show the slave controllers 100C and 100D.

The master controller 100A is a sub system electrically connected to the DC/DC converter 32A, and the slave controllers 100B, 100C, 100D, and 100E to control these parts. The master controller 100A is further electrically connected to a higher controller 50 described below to allow mutual communication with the higher controller 50. Note that the expression "electrically connected" in the present application is not limited to a state of wired connection, but also includes a state of wireless communication.

The slave controllers 100B, 100C, 100D, and 100E are sub systems electrically connected to the DC/DC converters 32B, 32C, 32D, and 32E, respectively, to control the DC/DC converters 32.

Figure 2:
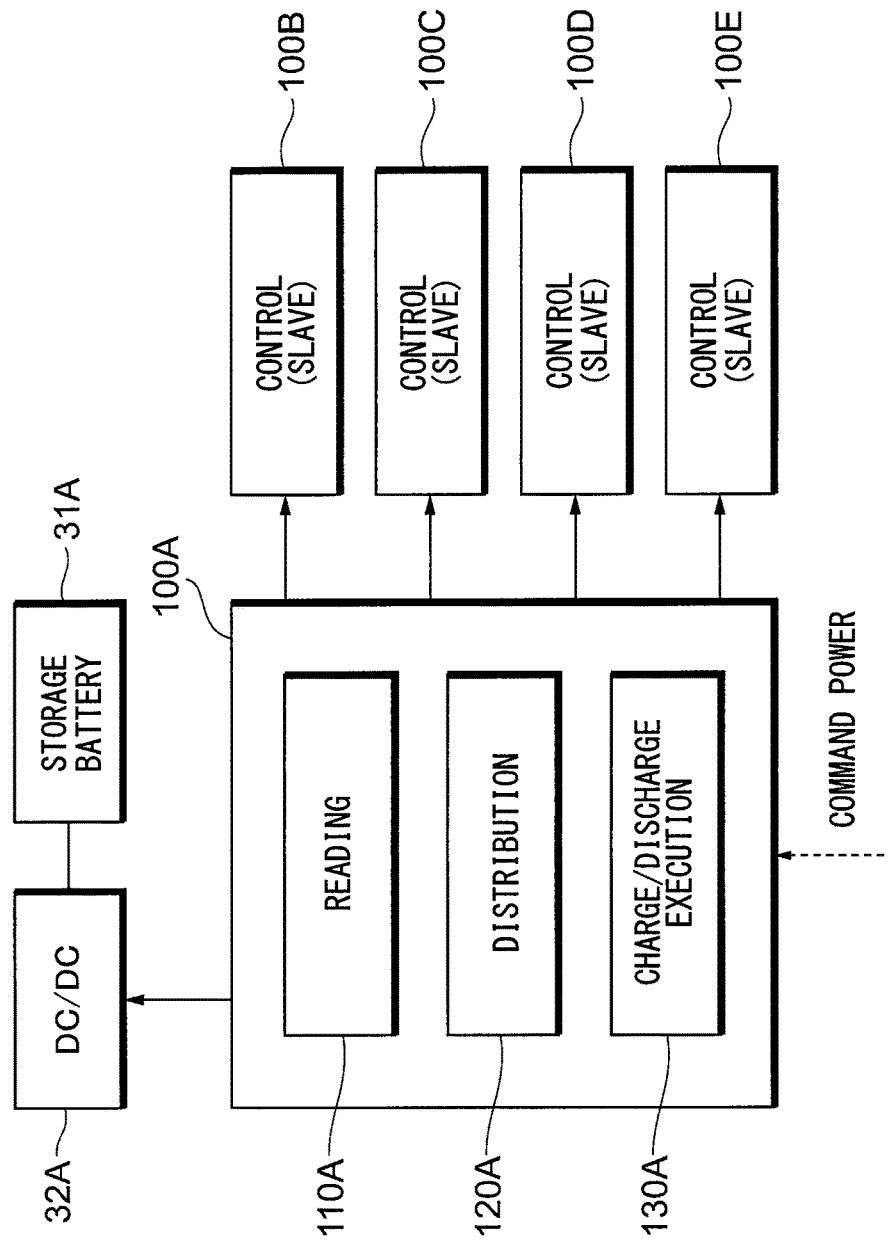
FIG. 2 is a function block diagram illustrating the control apparatus in FIG. 1.

As illustrated in FIG. 2, the master controller 100A includes a functional control block configured by a reading part 110A, a distribution part 120A, and a charge/discharge execution part 130A. The functions of the respective parts will be described below.

The storage battery system 61 having this configuration performs charge or discharge based on a command received from the higher controller 50. The higher controller 50 is a device that adjusts demand power corresponding to power demanded by the load LD, and supply power corresponding to power supplied from the storage battery system 61 to the load LD. In addition, the higher controller 50 is electrically connected to the interconnection inverters 40 to control the interconnection inverters 40.

When a command received by the master controller 100A from the higher controller 50 is a request for charge by the storage battery system 61, the reading part 110A of the master controller 100A reads command power (hereinafter also referred to as "charge command power") from the command.

In this case, the distribution part 120A of the master controller 100A determines distribution power corresponding to power to be charged in each of the storage batteries 31 (hereinafter also referred to as "distribution charge power") for charge of the charge command power read by the reading part 110A. More specifically, the distribution part 120A determines distribution charge power for each of the storage batteries 31 such that that the sum total of distribution charge power of the respective storage batteries 31 becomes equal to the charge command power.

The charge/discharge execution part 130A of the master controller 100A charges each of the storage batteries 31 with distribution charge power determined by the distribution part 120A. More specifically, this charge is executed based on a control signal transmitted from the master controller 100A to the DC/DC converter 32A and the slave controllers 100B, 100C, 100D, and 100E. The DC/DC converter 32A having received this signal charges the storage battery 31A with the determined distribution charge power. On the other hand, the slave controllers 100B, 100C, 100D, and 100E having received this signal transmit control signals to the DC/DC converters 32B, 32C, 32D, and 32E, respectively, and charge the storage batteries 31B, 31C, 31D, and 31E with the determined distribution charge power, respectively. When the charge command power is low, the distribution charge power of a part of the storage batteries 31 may become zero. In this case, substantially no power is charged in the corresponding storage batteries 31.

When the command received by the master controller 100A from the higher controller 50 is a request for discharge from the storage battery system 61, the reading part 110A of the master controller 100A reads command power (hereinafter also referred to as "discharge command power").

In this case, the distribution part 120A of the master controller 100A determines power to be discharged from each of the storage batteries 31 (hereinafter also referred to as "distribution discharge power") for discharge of the discharge command power read by the reading part 110A. More specifically, the distribution part 120A determines distribution discharge power for each of the storage batteries 31 such that the sum total of distribution discharge power of the respective storage batteries 31 becomes equal to the discharge command power.

The charge/discharge execution part 130A of the master controller 100A is a section which discharges the distribution discharge power determined by the distribution part 120A from the storage batteries 31. Similarly to the charge described above, this discharge is executed based on a control signal transmitted from the master controller 100A to the DC/DC converter 32A and the slave controllers 100B, 100C, 100D, and 100E. When the discharge command power is low, the distribution discharge power of a part of the storage batteries 31 may become zero. In this case, substantially no power is discharged from the corresponding storage batteries 31.

Accordingly, a storage battery group 10 configured by the storage batteries 31, the control apparatus 100 and the like function like a single large storage battery to perform charge or discharge as viewed from the higher controller 50.

Figure 3:
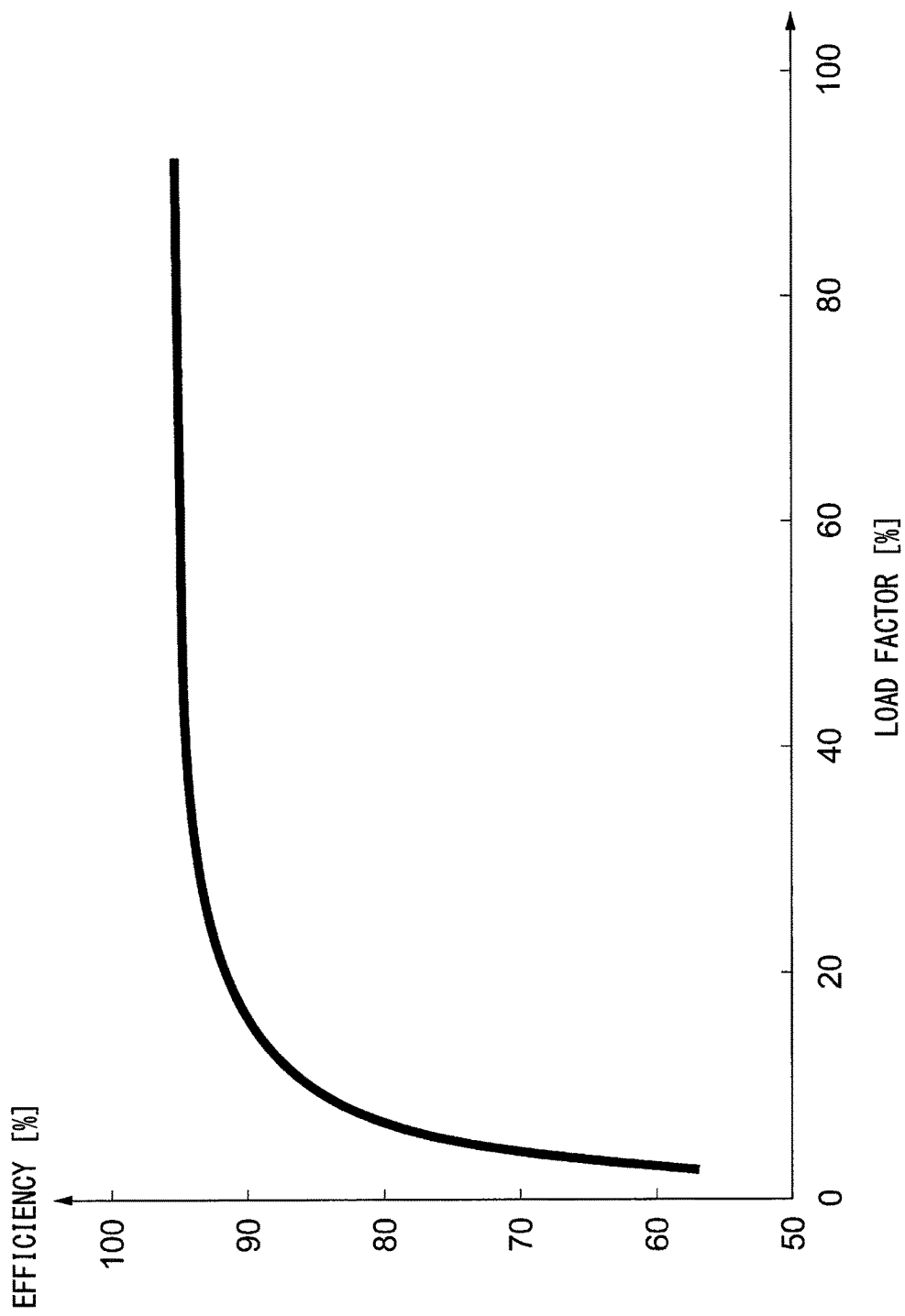
FIG. 3 is a diagram showing a relationship between efficiency and a load factor of a converter in FIG. 1.

Driving efficiency of each of the DC/DC converters 32 is hereinafter described with reference to FIG. 3. FIG. 3 shows a relationship between a load factor and efficiency of the DC/DC converter 32.

The "load factor" on a horizontal axis of a graph represents a ratio of power input to the DC/DC converter 32 to a rated input/output of the DC/DC converter 32 as expressed in percentage. The load factor therefore increases with a rise of power discharged from the storage battery 31, or power charged in the storage battery 31 via the direct current bus line SL2. When the load factor is 100%, power substantially equal to the rated input/output of the DC/DC converter 32 is charged or discharged.

The "efficiency" on a vertical axis of the graph represents a ratio of power output from the DC/DC converter 32 to power input to the DC/DC converter 32 as expressed in percentage. In a state that power input to the DC/DC converter 32 is constant, the efficiency therefore increases with a rise of the power output from the DC/DC converter 32. When the efficiency is 100%, power substantially equal to power input to the DC/DC converter 32 is output from the DC/DC converter 32.

As apparent from FIG. 3, the efficiency of the DC/DC converter 32 increases as the load factor increases. The efficiency becomes the maximum and close to 100% when the load factor is 100%. The DC/DC converter 32 is therefore characterized in that efficiency increases as input power approaches the rated input/output of the DC/DC converter 32. In other words, efficiency lowers when power input to the DC/DC converter 32 extremely deviates from the rated input/output of the DC/DC converter 32. In this case, driving efficiency of the storage battery system 61 may lower.

Figure 4:
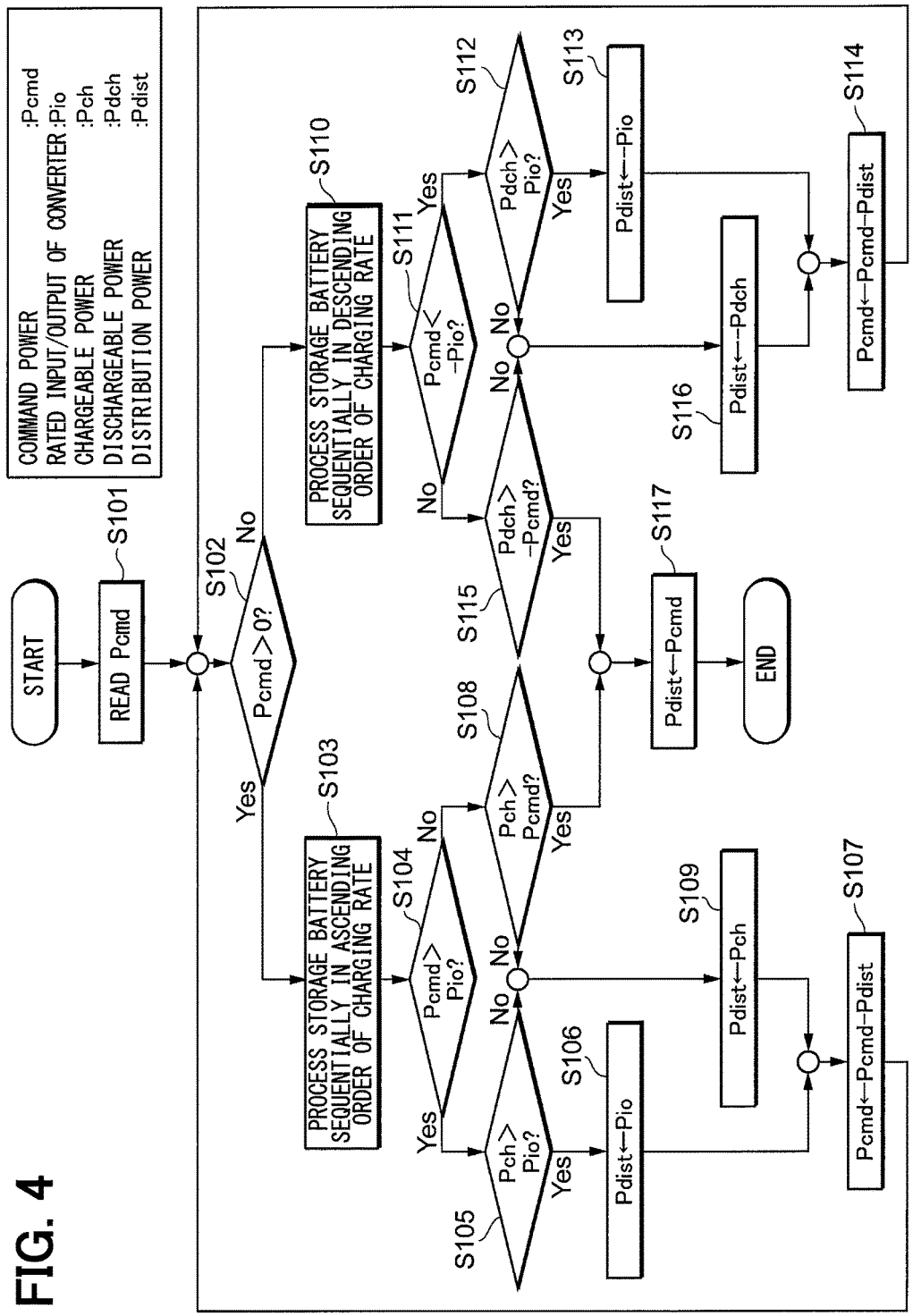
FIG. 4 is a flowchart showing a flow of a process performed by the control apparatus in FIG. 1.

Accordingly, the distribution part 120A of the master controller 100A determines distribution power to be charged in or discharged from each of the storage batteries 31 while considering this characteristic of the DC/DC converter 32. Described hereinbelow with reference to FIG. 4 is a process executed by the master controller 100A to determine distribution power for each of the storage batteries 31.

In S101, the master controller 100A reads command power Pcmd. The command power Pcmd has a positive value for a request of charge issued from the higher controller 50 to the storage battery group 10, and has a negative value for a request of discharge issued from the higher controller 50 to the storage battery group 10. More specifically, the command power Pcmd indicating a positive value corresponds to the charge command power described above. On the other hand, the command power Pcmd indicating a negative value corresponds to the discharge command power described above.

In subsequent S102, the master controller 100A determines whether the command power Pcmd is a positive value. When it is determined that the command power Pcmd is a positive value (S102: Yes), that is, when the higher controller 50 requests charge of the storage battery group 10, the master controller 100A proceeds to S103 to determine distribution power Pdist to be charged in each of the storage batteries 31.

The distribution power Pdist herein is power charged in or discharged from each of the storage batteries 31. The distribution power Pdist having a positive value corresponds to the charge command power described above. The distribution power Pdist having a negative value corresponds to the discharge command power described above.

In subsequent S103, the master controller 100A switches the target storage battery 31 to sequentially determine the distribution power Pdist for each of the storage batteries 31 in the ascending order of charging rates of the storage batteries 31. In the initial processing of S103, the storage battery 31 exhibiting the smallest charging rate is selected from the storage batteries 31. According to the example discussed herein, the charging rate of the storage battery 31A is smaller than the charging rate of any other storage batteries 31.

In subsequent S104, the master controller 100A determines whether the command power Pcmd is higher than a rated input/output Pio of the converter 32A. When it is determined that the command power Pcmd is higher than the rated input/output Pio of the converter 32A (S104: Yes), the master controller 100A proceeds to S105.

In subsequent S105, the master controller 100A determines whether chargeable power Pch of the storage battery 31A is higher than the rated input/output Pio of the converter 32A. In this case, the chargeable power Pch is zero or has a positive value calculated by a following equation f1 based on a storage capacity and the charging rate of the storage battery 31A.

(Equation 1)

Chargeable power $P\_ch$=storage battery capacity−charging rate/100*storage battery capacity  (Equation f1)

When it is determined that the chargeable power Pch of the storage battery 31A is higher than the rated input/output Pio of the converter 32A in S105 (S105: Yes), the master controller 100A proceeds to S106.

In subsequent S106, the master controller 100A sets the distribution power Pdist of the storage battery 31A to a value equal to the rated input/output Pio of the converter 32A. More specifically, the master controller 100A determines the distribution power Pdist of the storage battery 31A such that the converter 32A is driven at the largest load factor to increase efficiency.

On the other hand, when it is determined that the chargeable power Pch of the storage battery 31A is not higher than the rated input/output Pio of the converter 32A in S105 (S105: No), the master controller 100A proceeds to S109.

In addition, when it is determined that the command power Pcmd is not higher than the rated input/output Pio of the converter 32A in S104 (S104: No), the master controller 100A proceeds to S108.

In subsequent S108, the master controller 100A determines whether the chargeable power Pch of the storage battery 31A is higher than the command power Pcmd. When it is determined that the chargeable power Pch of the storage battery 31A is not higher than the command power Pcmd (S108: No), the master controller 100A proceeds to S109.

In S109, the master controller 100A sets the distribution power Pdist of the storage battery 31A to a value equal to the chargeable power Pch of the storage battery 31A. In other words, the master controller 100A determines the distribution power Pdist such that the charging rate of the storage battery 31A becomes substantially 100%.

After completion of processing in S106 or S109, the master controller 100A proceeds to S107. In S107, the master controller 100A subtracts the distribution power Pdist of the storage battery 31A from the command power Pcmd, and sets the result to new command power Pcmd. After completion of processing in S107, the master controller 100A returns to processing in S102.

In subsequent S102, the master controller 100A determines whether the new command power Pcmd is a positive value. When the command power Pcmd is a positive value (S102: Yes), the master controller 100A proceeds to S103.

In subsequent S103, the master controller 100A switches the target for determining the distribution power Pdist from the storage battery 31A to another one of the storage batteries 31. More specifically, the master controller 100A switches the target from the storage battery 31A to the storage battery 31 exhibiting the second smallest charging rate.

Thereafter, the master controller 100A sequentially switches the target for determining the distribution power Pdist. When the new command power Pcmd is higher than the rated input/output Pio of the converter 32 of the target storage battery 31 (S104: Yes), the master controller 100A sets the distribution power Pdist to either the rated input/output Pio of the converter 32 (S106) or the chargeable power Pch (S109) in the manner described above.

On the other hand, when it is determined that the chargeable power Pch of the storage battery 31A is higher than the command power Pcmd in S108 (S108: Yes), the master controller 100A proceeds to S117.

In subsequent S117, the master controller 100A sets the distribution power Pdist of the storage battery 31A to a value equal to the command power Pcmd, and terminates the process.

On the other hand, when it is determined that the command power Pcmd is not a positive value in S102 (S102: No), that is, when the higher controller 50 requests discharge from the storage battery group 10, the master controller 100A proceeds to S110 to determine the distribution power Pdist corresponding to power discharged from the storage batteries 31.

In subsequent S110, the master controller 100A switches the target storage battery 31 to sequentially determine the distribution power Pdist of each of the storage batteries 31 in the descending order of the charging rates of the storage batteries 31. In the initial processing of S110, the storage battery 31 exhibiting the largest charging rate is selected from the storage batteries 31. According to the example described herein, the charging rate of the storage battery 31E is larger than the charging rate of any other storage batteries 31.

In subsequent S111, the master controller 100A determines whether the command power Pcmd is lower than a positive/negative inversion value of the rated input/output Pio of the converter 32A. When it is determined that the command power Pcmd is lower than the positive/negative inversion value of the rated input/output Pio of the converter 32E (S111: Yes), the master controller 100A proceeds to S112.

In subsequent S112, the master controller 100A determines whether dischargeable power Pdch of the storage battery 31E is higher than the rated input/output Pio of the converter 32E. The dischargeable power Pdch herein is zero or a positive value calculated by a following equation f2 based on the charging rate, the storage capacity, and the minimum storage residual amount of each of the storage batteries 31. As indicated in the following equation f2, each of the storage batteries 31 is configured not to produce a state of no storage residual amount, but to secure the minimum storage residual amount. This configuration is adopted to prevent difficulties caused when the storage batteries 31 discharge the storage residual amount to zero, such as performance deterioration and shortening of life of the storage batteries 31.

(Equation 2)

Dischargeable power $P\_dch$=charging rate/100*storage battery capacity−minimum storage residual amount (Equation f2)

When it is determined that the dischargeable power Pdch of the storage battery 31E is higher than the rated input/output Pio of the converter 32E in S112 (S112: Yes), the master controller 100A proceeds to S113.

In subsequent S113, the master controller 100A sets the distribution power Pdist of the storage battery 31E to a value equal to the positive/negative inversion value of the rated input/output Pio of the converter 32E. More specifically, the master controller 100A determines the distribution power Pdist of the storage battery 31E such that the converter 32E is driven at the largest load factor to increase efficiency.

On the other hand, when it is determined that the dischargeable power Pdch of the storage battery 31E is not higher than the rated input/output Pio of the converter 32E in S112 (S112: No), the master controller 100A proceeds to S116.

In addition, when it is determined that the command power Pcmd is not lower than the positive/negative inversion value of the rated input/output Pio of the converter 32E in S111 (S111: No), the master controller 100A proceeds to S115.

In subsequent S115, the master controller 100A determines whether the dischargeable power Pdch of the storage battery 31E is higher than the positive/negative inversion value of the command power Pcmd. When it is determined that the dischargeable power Pdch of the storage battery 31E is not higher than the positive/negative inversion value of the command power Pcmd (S115: No), the master controller 100A proceeds to S116.

In S116, the master controller 100A sets the distribution power Pdist of the storage battery 31E to a value equal to the positive/negative inversion value of the dischargeable power Pdch of the storage battery 31E. More specifically, the master controller 100A determines the distribution power Pdist such that the storage residual amount of the storage battery 31E becomes the minimum storage residual amount described above.

After completion of S113 or S116, the master controller 100A proceeds to S114. In S114, the master controller 100A subtracts the distribution power Pdist of the storage battery 31E from the command power Pcmd, and sets the calculated value to new command power Pcmd. After completion of processing in S114, the master controller 100A returns to S102.

In subsequent S102, the master controller 100A determines whether the new command power Pcmd is a positive value. When it is determined that the new command power Pcmd is not a positive value (S102: No), the master controller 100A proceeds to S110.

In subsequent S110, the master controller 100A switches the target for determining the distribution power Pdist from the storage battery 31E to another one of the storage batteries 31. More specifically, the master controller 100A switches the target from the storage battery 31E to the storage battery 31 exhibiting the second largest charging rate.

Thereafter, the master controller 100A sequentially switches the target for determining the distribution power Pdist. When the new command power Pcmd is lower than the positive/negative inversion value of the rated input/output Pio of the converter 32 of the storage battery 31 corresponding to the target (S111: Yes), the master controller 100A sets the distribution power Pdist to either the positive/negative inversion value of the rated input/output Pio of the converter 32 (S113), or the positive/negative inversion value of the dischargeable power Pdch (S116) in the manner described above.

On the other hand, when it is determined that the dischargeable power Pdch of the storage battery 31E is higher than the positive/negative inversion value of the new command power Pcmd in S115 (S115: Yes), the master controller 100A proceeds to S117.

In subsequent S117, the master controller 100A sets the distribution power Pdist of the storage battery 31E to a value equal to the command power Pcmd, and ends the process.

As described above, the control apparatus 100 sequentially determines the distribution power Pdist for each of the multiple storage batteries 31 in the ascending order of the charging rates of the storage batteries 31 when the reading part 110A reads the command power Pcmd requesting charge. In addition, the control apparatus 100 sets the distribution power Pdist of the storage battery 31 to a value substantially equal to the rated input/output Pio when the storage battery 31 exhibits the chargeable power Pch higher than the rated input/output Pio of the converter 32. Accordingly, when charge of the storage battery group 10 is requested, the distribution power Pdist substantially equal to the rated input/output Pio of the converter 32 is charged in each of the storage batteries 31 in the ascending order of the charging rates. As a result, it may be possible to achieve high efficiency of charge.

On the other hand, the control apparatus 100 sequentially determines the distribution power Pdist for each of the multiple storage batteries 31 in the descending order of the charging rates of the storage batteries 31 when the reading part 110A reads the command power Pcmd requesting discharge. In this case, the control apparatus 100 sets the distribution power Pdist of the storage battery 31 to a value substantially equal to the rated input/output Pio when the storage battery 31 exhibits the dischargeable power Pdch higher than the rated input/output Pio of the converter 32. Accordingly, when discharge of the storage battery group 10 is requested, the distribution power Pdist substantially equal to the rated input/output Pio of the converter 32 is discharged from each of the storage batteries 31 in the descending order of the charging rates. As a result, it may be possible to achieve high efficiency of discharge.

According to the control apparatus 100, as described above, the distribution power Pdist is determined in the ascending order or descending order of the charging rates of the storage batteries 31. In this case, the use rates of the storage batteries 31 configuring the storage battery group 10 improve. Moreover, the distribution power Pdist is determined as substantially equal to the rated input/output Pio of the converter 32. Accordingly, it may be possible to achieve high efficiency.

In addition, the dischargeable power Pdch of each of the storage batteries 31 is set to a value calculated by subtracting the minimum storage residual amount from the power charged in the corresponding storage battery 31. In this case, each of the storage batteries 31 does not produce a state of no storage residual amount. Accordingly, difficulties such as performance deterioration and life shortening of the storage batteries 31 are avoidable.

Note that the control apparatus 100 sets the distribution power Pdist of each of the storage batteries 31 to a value equal to the rated input/output Pio of the corresponding converter 32 in S106. However, the distribution power Pdist is not required to become completely equal to the rated input/output Pio in the present disclosure. More specifically, both the values are only required to lie within a substantially equal range including completely the same value, as long as the improvement of charge efficiency is recognizable approximately in the same level as the level of improvement of charge efficiency achieved when the distribution power Pdist is completely the same value as the rated input/output Pio. For example, the distribution power Pdist different from the rated input/output Pio of the converter 32 by approximately 20% is included in the scope of the present disclosure when the improvement of charge efficiency is recognizable in the same level of improvement of charge efficiency as the corresponding level achieved in a case not producing the difference. This is also applicable to discharge which sets the distribution power Pdist of each of the storage batteries 31 to a value equal to the positive/negative inversion value of the rated input/output Pio of the corresponding converter 32.

Figure 5:
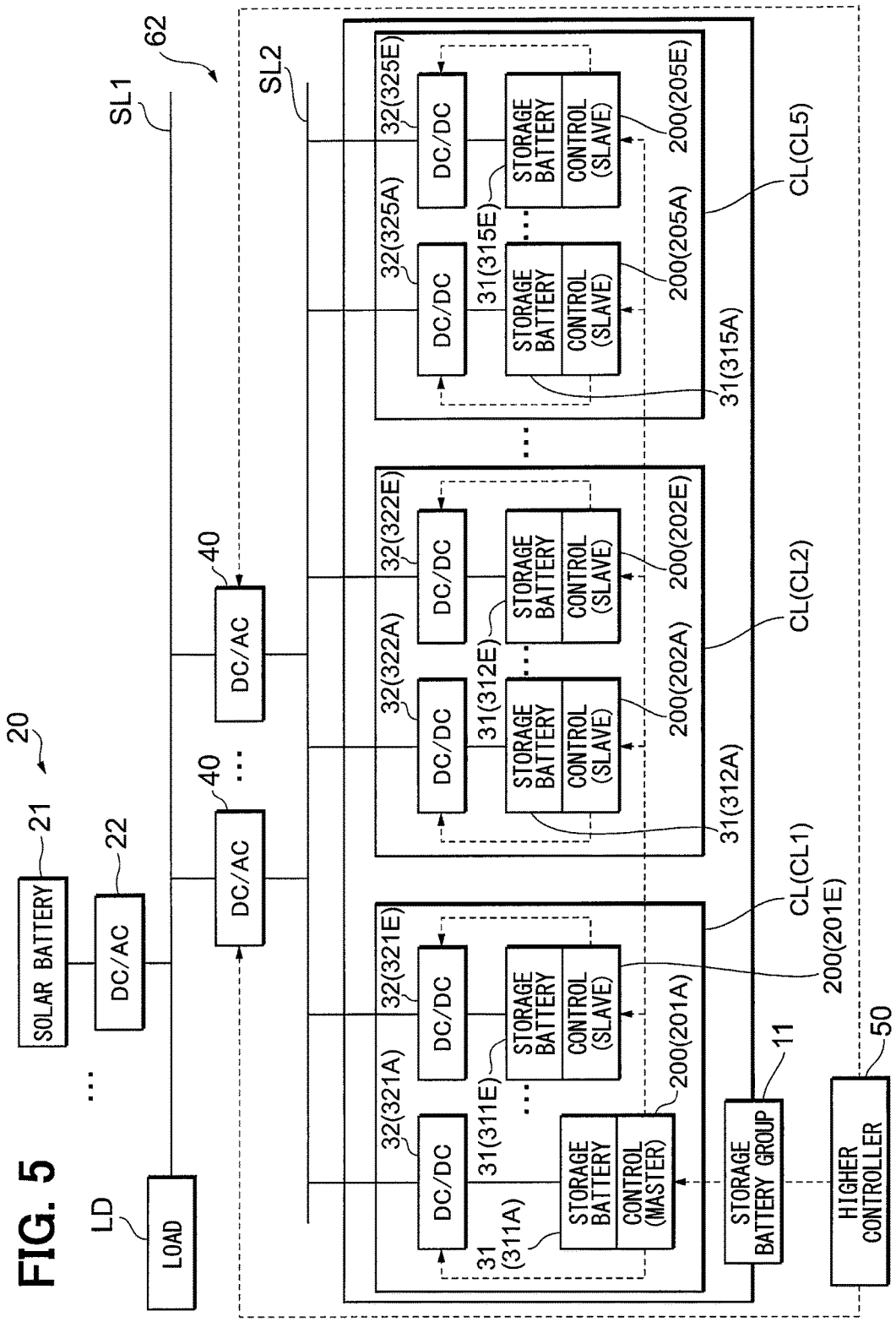
FIG. 5 is a configuration diagram illustrating a control apparatus according to a second embodiment, and a storage battery system including the control apparatus.
Figure 6:
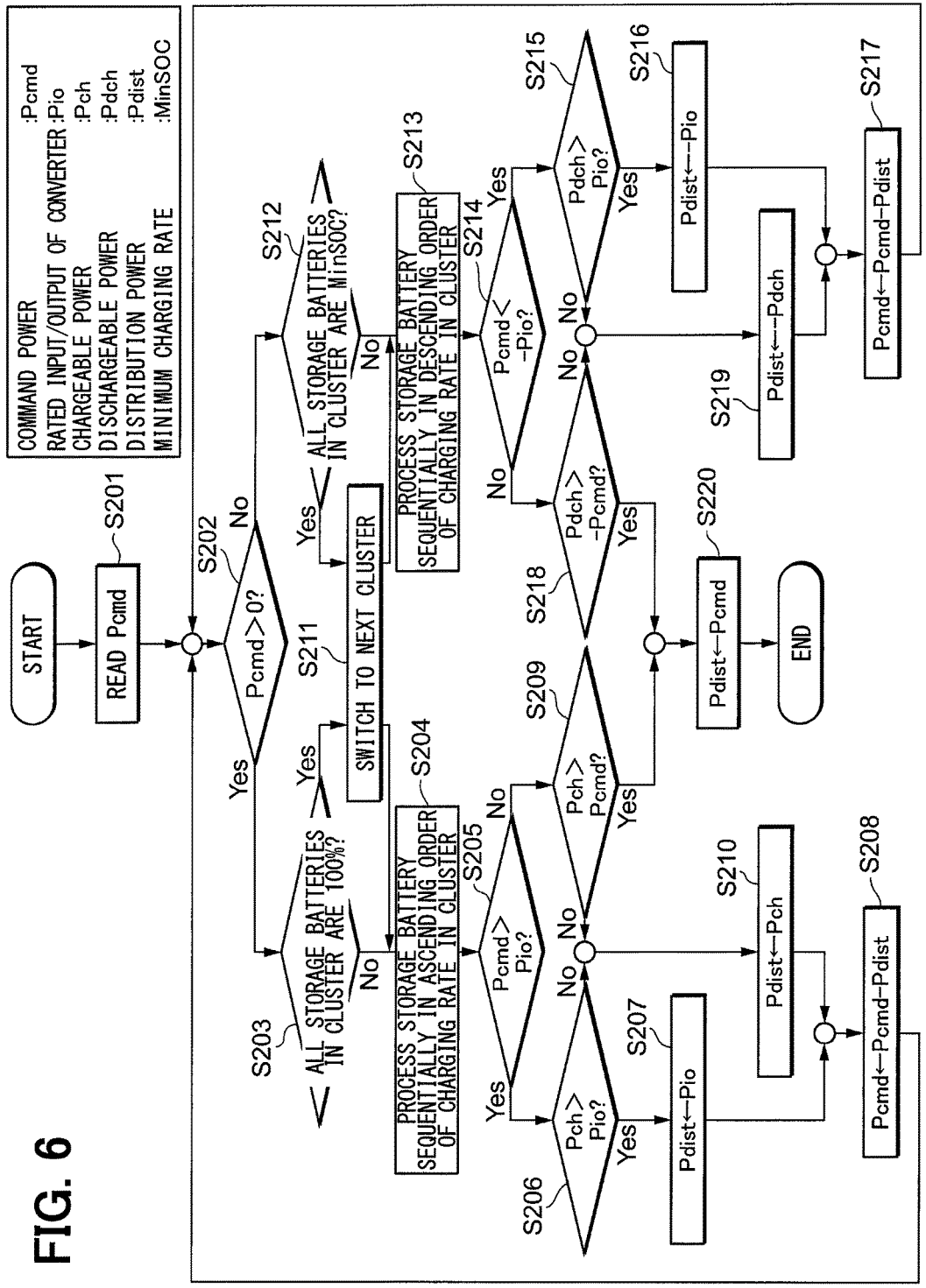
FIG. 6 is a flowchart showing a flow of a process performed by the control apparatus in FIG. 5.

A control apparatus 200 according to a second embodiment of the present disclosure is hereinafter described with reference to FIGS. 5 and 6. Note that parts common to the first embodiment and the second embodiment have been given similar reference numbers. The description of these parts is omitted where appropriate.

The control apparatus 200 of the second embodiment is different from the control apparatus 100 of the first embodiment in that performed is a process specialized for a storage battery system 62 corresponding to a control target. The multiple storage batteries 31 and DC/DC converters 32 included in the storage battery system 62 configure multiple clusters CL. The multiple clusters CL include clusters CL1, CL2, CL3, CL4, and CL5. FIG. 5 does not show the clusters CL3 and CL4.

Each of the clusters CL includes the five pairs of storage batteries 31 and DC/DC converters 32. FIG. 5 does not show a part of the storage batteries 31 and DC/DC converters 32 included in each of the clusters CL. Each of the clusters CL is connected to the direct current bus line SL2 in parallel.

The control apparatus 200 is hereinafter described. The control apparatus 200 is a part of a computer system which performs integrated control for the entire storage battery system 62. The cluster CL1 includes a master controller 201A, and slave controllers 201B, 201C, 201D, and 201E. On the other hand, all the control apparatus 200 provided on each of the clusters CL2, CL3, CL4, and CL5 are configured by slave controllers controlled by the master controller 201A.

The master controller 201A is a sub system electrically connected to a DC/DC converter 321A, and slave controllers corresponding to different control apparatus 200 to control these units. In addition, the master controller 201A is electrically connected to the higher controller 50 for mutual communication therebetween. The master controller 201A performs functions identical to the functions of the reading part 110A, the distribution part 120A, and the charge/discharge execution part 130A of the master controller 100A described above.

Accordingly, a storage battery group 11 including the multiple clusters CL functions like a large storage battery capable of performing charge and discharge as viewed from the higher controller 50.

Furthermore, the master controller 201A has a function of managing charge and discharge of the respective storage batteries 31 in units of cluster CL. Discussed hereinbelow with reference to FIG. 6 is a process executed by the master controller 201A when determining distribution power for each of the storage batteries 31.

In S201, the master controller 201A reads command power Pcmd.

In subsequent S202, the master controller 201A determines whether the command power Pcmd is a positive value. When it is determined that the command power Pcmd is a positive value (S202: Yes), that is, the higher controller 50 requests charge of the storage battery group 11, the master controller 201A proceeds to S203 to determine distribution power Pdist to be charged in each of the storage batteries 31.

The master controller 201A executes processing in and after S203 for each of the clusters CL in an order determined beforehand for charge. Discussed herein is an example of the processing order determined beforehand in such a manner as to process the cluster CL1 first, the cluster CL2 second, the cluster CL3 third, the cluster CL4 fourth, and finally the cluster CL5.

In S203, the master controller 201A determines whether charging rates of all of the storage batteries 31 included in the cluster CL1 are 100%. When at least one of the storage batteries 31 included in the cluster CL1 has a charging rate smaller than 100% (S203: No), the master controller 201A proceeds to S204.

In subsequent S204, the master controller 201A switches the target storage battery 31 to sequentially determine the distribution power Pdist in the cluster CL1 in the ascending order of the charging rates of the storage batteries 31 in the cluster CL1. In the initial processing of S204, the storage battery 31 exhibiting the smallest charging rate is selected from the storage batteries 31 within the cluster CL1. According to the example discussed herein, the charging rate of the storage battery 311A is smaller than the charging rate of any other storage batteries 31 in the cluster CL1.

The master controller 201A executes processing from S205 to S210 for the storage battery 311A in an appropriate manner. The processing from S205 to S210 is similar to the foregoing processing from S104 to S109 shown in FIG. 4, and therefore the description of this processing is not repeated herein.

The master controller 201A calculates new command power Pcmd in S208, and returns to S202. When it is determined that the new command power Pcmd is a positive value in S202 (S202: Yes), the master controller 201A proceeds to S203.

In S203, the master controller 201A determines whether charging rates of all of the storage batteries 31 included in the cluster CL1 are 100%. More specifically, the master controller 201A determines whether the charging rates of all the storage batteries 31 in the cluster CL1 reach 100% as a result of charge with the distribution power Pdist determined in the previous cycle. When at least one of the storage batteries 31 in the cluster CL1 has a charging rate smaller than 100% even after the charge with the distribution power Pdist determined in the previous cycle (S203: No), the master controller 201A proceeds to S204.

In subsequent S204, the master controller 201A switches the target for determining the distribution power Pdist from the storage battery 311A to another one of the storage batteries 31 in the cluster CL1. More specifically, the master controller 201A switches the target from the storage battery 311A to the storage battery 31 exhibiting the second smallest charging rate.

Thereafter, the master controller 201A sequentially switches the target for determining the distribution power Pdist within the cluster CL1. When the new command power Pcmd is higher than the rated input/output Pio of the converter 32 of the target storage battery 31 (S205: Yes) in a state that at least one of the storage batteries 31 within the cluster CL1 has a charging rate not reaching 100% even after charge of the distribution power Pdist determined in the previous cycle (S203: No), the master controller 201A sets the distribution power Pdist to either the rated input/output Pio of the converter 32 (S207) or the chargeable power Pch (S210).

When it is determined that the charging rates of all the storage batteries 31 within the cluster CL1 are 100% in S203 (S203: Yes), the master controller 201A proceeds to S211.

In subsequent S211, the master controller 201A switches the target for processing in and after S204 from the cluster CL1 to another one of the clusters CL. More specifically, the master controller 201A switches the target from the cluster CL1 to the cluster CL2 set to the second cluster in the order determined beforehand.

Thereafter, the master controller 201A determines the distribution power Pdist for each of the storage batteries 31. When the charging rates of all the storage batteries 31 included in the cluster CL corresponding to the processing target become 100% (S203: Yes), the master controller 201A sequentially switches the cluster CL corresponding to the processing target.

On the other hand, when it is determined that the command power Pcmd is not a positive value in S202 (S202: No), that is, the higher controller 50 requests discharge from the storage battery group 11, the master controller 201A proceeds to S212 to determine the distribution power Pdist corresponding to power discharged from each of the storage batteries 31.

The master controller 201A executes processing in and after S212 for each of the clusters CL in an order determined beforehand for discharge. Discussed herein is an example of the processing order determined beforehand in such a manner as to process the cluster CL5 first, the cluster CL4 second, the cluster CL3 third, the cluster CL2 fourth, and finally the cluster CL1.

In S212, the master controller 201A determines whether charging rates of all the storage batteries 31 included in the cluster CL5 are the minimum charging rate. When at least one of the storage batteries 31 included in the cluster CL5 exhibits a charging rate not a minimum charging rate MinSOC (S212: No), the master controller 201A proceeds to S213.

In subsequent S213, the master controller 201A switches the target storage battery 31 to sequentially determine the distribution power Pdist in the cluster CL5 in the descending order of the charging rates of the storage batteries 31 in the cluster CL5. In the initial processing of S213, the storage battery 31 exhibiting the largest charging rate is selected from the storage batteries 31 within the cluster CL5. According to the example discussed herein, the charging rate of the storage battery 315E is larger than the charging rate of any other storage batteries 31 in the cluster CL5.

The master controller 201A executes processing from S214 to S219 for the storage battery 315E in an appropriate manner. The processing from S214 to S219 is similar to the foregoing processing from S111 to S116 shown in FIG. 4, and therefore the description of this processing is not repeated herein.

The master controller 201A calculates new command power Pcmd in S217, and returns to S202. When it is determined that the new command power Pcmd is not a positive value in S202 (S202: No), the master controller 201A proceeds to S212.

In S212, the master controller 201A determines whether the charging rates of all the storage batteries 31 in the cluster CL5 are the minimum charging rate MinSOC. More specifically, the master controller 201A determines whether the charging rates of all the storage batteries 31 in the cluster CL5 reach the minimum charging rate MinSOC as a result of discharge of the distribution power Pdist determined in the previous cycle. When at least one of the storage batteries 31 in the cluster CL5 exhibits a charging rate not the minimum distribution power MinSOC even after the discharge of the distribution power Pdist determined in the previous cycle (S212: No), the master controller 201A proceeds to S213.

In subsequent S213, the master controller 201A switches the target for determining the distribution power Pdist from the storage battery 315E to another one of the storage batteries 31 within the cluster CL5. More specifically, the master controller 201A switches the target from the storage battery 315E to the storage battery 31 exhibiting the second largest charging rate.

Thereafter, the master controller 201A sequentially switches the target for determining the distribution power Pdist within the cluster CL5. When the new command power Pcmd is lower than the positive/negative inversion value of the rated input/output Pio of the converter 32 of the target storage battery 31 (S214: Yes) in a state that at least one of the storage batteries 31 within the cluster CL5 exhibits a charging rate not the minimum charging rate MinSOC even after discharge of the distribution power Pdist determined in the previous cycle (S212: No), the master controller 201A sets the distribution power Pdist to either the positive/negative inversion value of the rated input/output Pio of the converter 32 (S216) or the positive/negative inversion value of the dischargeable power Pdch (S219).

When it is determined that the charging rates of all the storage batteries 31 in the cluster CL5 are the minimum charging rate MinSOC in S212 (S212: Yes), that is, it is determined that the charging rates of all the storage batteries 31 in the cluster CL5 reach the minimum charging rate MinSOC by discharge of the distribution power Pdist determined in the previous cycle, the master controller 201A proceeds to S211.

In subsequent S211, the master controller 201A switches the target for processing in and after S213 from the cluster CL5 to another one of the clusters CL. More specifically, the master controller 201A switches the target from the cluster CL5 to the cluster CL4 set to the second cluster in the order determined beforehand.

Thereafter, the master controller 201A sequentially determines the distribution power Pdist for each of the storage batteries 31. When the charging rates of all the storage batteries 31 in the cluster CL corresponding to the processing target reach the minimum charging rate MinSOC (S212: Yes), the master controller 201A switches the cluster CL corresponding to the processing target.

As described above, the control apparatus 200 determines the distribution power Pdist of the storage batteries 31 for each of the clusters CL in the order determined beforehand after reading the command power Pcmd requesting charge. When the charging rates of the storage batteries 31 of one of the clusters CL reach 100% as a result of charge, the control apparatus 200 determines the distribution power Pdist of the storage batteries 31 in another cluster CL.

On the other hand, the control apparatus 200 determines the distribution power Pdist of the storage batteries 31 for each of the clusters CL in the order determined beforehand after reading the command power Pcmd requesting discharge. When the charging rates of the storage batteries 31 of one of the clusters CL drop to the minimum charging rate MinSOC as a result of discharge, the control apparatus 200 determines the distribution power Pdist of the storage batteries 31 of another cluster CL.

In this case, the use rates of the storage batteries 31 improve even when the storage battery group 11 includes the cluster CL configured by the multiple clusters CL. Moreover, the distribution power Pdist is determined as substantially equal to the rated input/output Pio of the converter 32. Accordingly, it may be possible to achieve high efficiency.

Control apparatus in various modes are provided according to the present disclosure. A control apparatus according to an example of the present disclosure is a control apparatus for a storage battery system which discharges power from multiple storage batteries configuring a storage battery group, converts the discharged power by using a power converter, and supplies the converted power to a load. The storage battery system also receives supply of power from an outside to the storage battery group, converts the received power by using the power converter, and charges the multiple storage batteries with the converted power. The control apparatus includes: a reading part that reads charge command power and discharge command power for the storage battery group; a distribution part that determines distribution charge power corresponding to power to be charged in each of the multiple storage batteries, based on the charge command power, and determines distribution discharge power corresponding to power to be discharged from each of the multiple storage batteries based on the discharge command power; and a charge/discharge execution part that allows charge or discharge of the multiple storage batteries, based on the distribution charge power or the distribution discharge power, which are determined by the distribution part. When the reading part reads the charge command power, the distribution part sequentially determines the distribution charge power for each of the multiple storage batteries in the ascending order of charging rates of the storage batteries, in such a manner that the distribution charge power for the storage battery exhibiting chargeable power higher than a rated input/output of the power converter becomes substantially equal to the rated input/output. On the other hand, when the reading part reads the discharge command power, the distribution part sequentially determines the distribution discharge power for each of the multiple storage batteries in the descending order of the charging rates of the storage batteries, in such a manner that the distribution discharge power for the storage battery exhibiting dischargeable power higher than the rated input/output of the power converter becomes substantially equal to the rated input/output.

According to the control apparatus of the present disclosure, the distribution charge power is determined in the ascending order of charging rates of the multiple storage batteries when the reading part reads the charge command power. In this case, the distribution charge power for the storage battery exhibiting chargeable power higher than the rated input/output of the power converter is set to a value substantially equal to the rated input/output. According to this configuration, the storage battery group is so controlled as to charge distribution charge power substantially equal to the rated input/output of the power converter in the ascending order of the charging rate at the time of a request for charge by the storage battery group. Accordingly, it may be possible to achieve charge with high efficiency.

According to the control apparatus of the present disclosure, the distribution discharge power is determined in the descending order of charging rates of the multiple storage batteries when the reading part reads the discharge command power. In this case, the distribution charge power for the storage battery exhibiting dischargeable power higher than the rated input/output of the power converter is set to a value substantially equal to the rated input/output. According to this configuration, the storage battery group is so controlled as to discharge distribution discharge power substantially equal to the rated input/output of the power converter in the descending order of the charging rate at the time of a request for discharge by the storage battery group. Accordingly, it may be possible to achieve discharge with high efficiency.

According to the control apparatus of the present disclosure, therefore, the distribution charge power or the distribution discharge power is determined in the ascending order or the descending order of the charging rate. In this case, use rates of the storage batteries configuring the storage battery group improve. Moreover, the distribution charge power and the distribution discharge power are determined as substantially equal to the rated input/output of the power converter. Accordingly, it may be possible to achieve high efficiency.

The distribution charge power and the distribution discharge power herein are set to values "substantially equal" to the rated input/output of each of the power converters for increasing efficiency of charge and discharge by the storage batteries. This expression does not mean that complete agreement between the distribution power and the rated input/output should be excluded. It is preferable that both the distribution power and the rated input/output completely agree with each other to increase the efficiency of charge and discharge by the storage battery to the maximum. However, the scope of the present disclosure is not limited to the state of complete agreement. The level of agreement between the distribution power and the rated input/output is only required to fall within a range of substantial agreement, including complete agreement, sufficient for improving efficiency of charge and discharge substantially in the same level as the level of the corresponding efficiency produced when the distribution charge power and the distribution discharge power are completely equal to the rated input/output of the power converter. For example, the scope of the present disclosure includes such a state that each of the distribution charge power and the distribution discharge power is different from the rated input/output of the power converter approximately by 20%, as long as efficiency of charge and discharge improves substantially in the same level as the level of corresponding efficiency produced when such a difference is absent.

Provided according to the present disclosure is a control apparatus for a storage battery system, the control apparatus being capable of achieving high efficiency while improving use rates of storage batteries configuring a storage battery group.

It is noted that a flowchart or the processing of the flowchart in the present application includes multiple steps (also referred to as sections), each of which is represented, for instance, as S101. Further, each step can be divided into several sub-steps while several steps can be combined into a single step.

While various embodiments, configurations, and aspects of the control apparatus have been exemplified, the embodiments, configurations, and aspects are not limited to those described above. For example, embodiments, configurations, and aspects obtained from an appropriate combination of technical elements disclosed in different embodiments, configurations, and aspects are also included within the scope of the present disclosure.

What is claimed is:

1. A control apparatus of a storage battery system which discharges power from a plurality of storage batteries configuring a storage battery group, converts the discharged power by using a power converter, and supplies the converted power to a load, and which receives supply of power from an outside to the storage battery group, converts the received power by using the power converter, and charges the plurality of storage batteries with the converted power, the control apparatus comprising:

a reading part that reads charge command power and discharge command power for the storage battery group;

a distribution part that determines distribution charge power corresponding to power to be charged in each of the plurality of storage batteries, based on the charge command power, and determines distribution discharge power corresponding to power to be discharged from each of the plurality of storage batteries, based on the discharge command power; and a charge-and-discharge execution part that allows charge or discharge of the plurality of storage batteries, based on the distribution charge power or the distribution discharge power determined by the distribution part, wherein:

when the reading part reads the charge command power, the distribution part sequentially determines the distribution charge power for each of the plurality of storage batteries in an ascending order of charging rates of the storage batteries, a storage battery exhibiting the chargeable power higher than a rated input/output of the power converter charges for the determined distribution charge power, so that the distribution charge power for the storage battery exhibiting the chargeable power higher than the rated input/output of the power converter becomes substantially equal to the rated input/output, and when the reading part reads the discharge command power, the distribution part sequentially determines the distribution discharge power for each of the plurality of storage batteries in a descending order of the charging rates of the storage batteries, the storage battery exhibiting dischargeable power higher than the rated input/output of the power converter discharges for the determined distribution discharge power, so that the distribution discharge power for the storage battery exhibiting the dischargeable power higher than the rated input/output of the power converter becomes substantially equal to the rated input/output; and the storage battery group includes a plurality of clusters each of which is configured by the plurality of storage batteries, when the reading part reads the charge command power, the distribution part determines the distribution charge power for the storage batteries for each of the clusters in an order determined beforehand and, in response to rises of the charging rates of the storage batteries of one of the clusters to a first predetermined value determined beforehand as a result of charge, determines the distribution charge power of the storage batteries of another cluster, and when the reading part reads the discharge command power, the distribution part determines the distribution discharge power of the storage batteries for each of the clusters in an order determined beforehand, and in response to drops of the charging rates of the storage batteries of one of the clusters to a second predetermined value determined beforehand as a result of discharge, determines the distribution discharge power of the storage batteries of another cluster, and discharges the storage batteries in accordance with the distribution discharge power.

2. The control apparatus according to claim 1, wherein: the dischargeable power from each of the storage batteries is set to an amount calculated by subtracting power of a predetermined amount from power charged in the corresponding storage battery.

* * * * *